Figure 3:
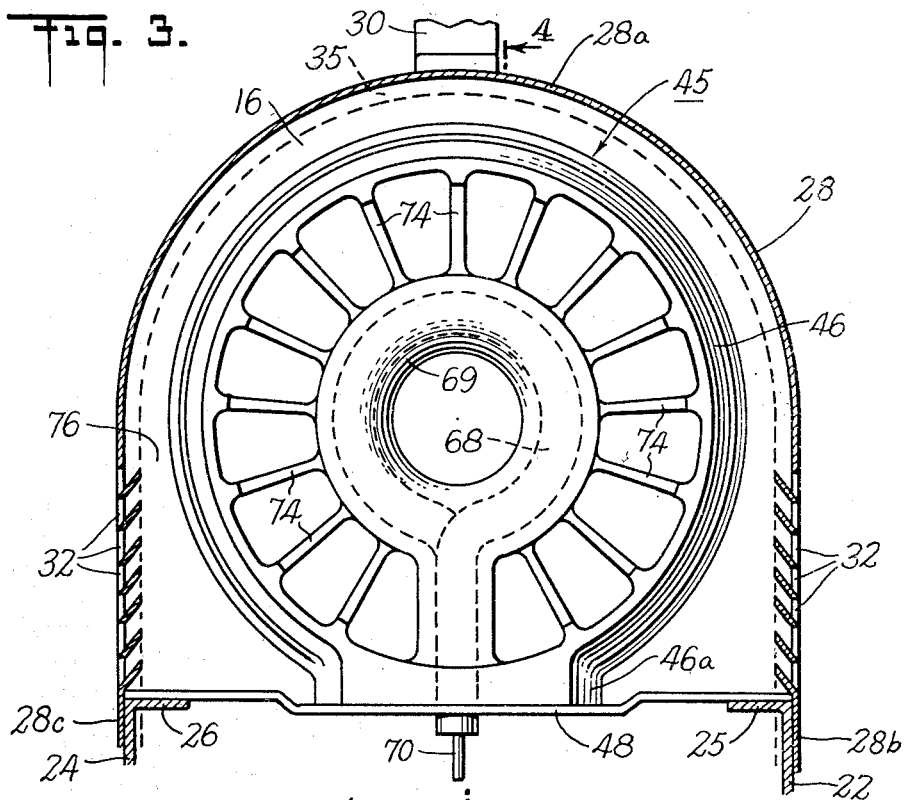

June 17, 1958  L. R. MAST  2,839,657
SPACE HEATER
Filed Nov. 1, 1956  4 Sheets-Sheet 1
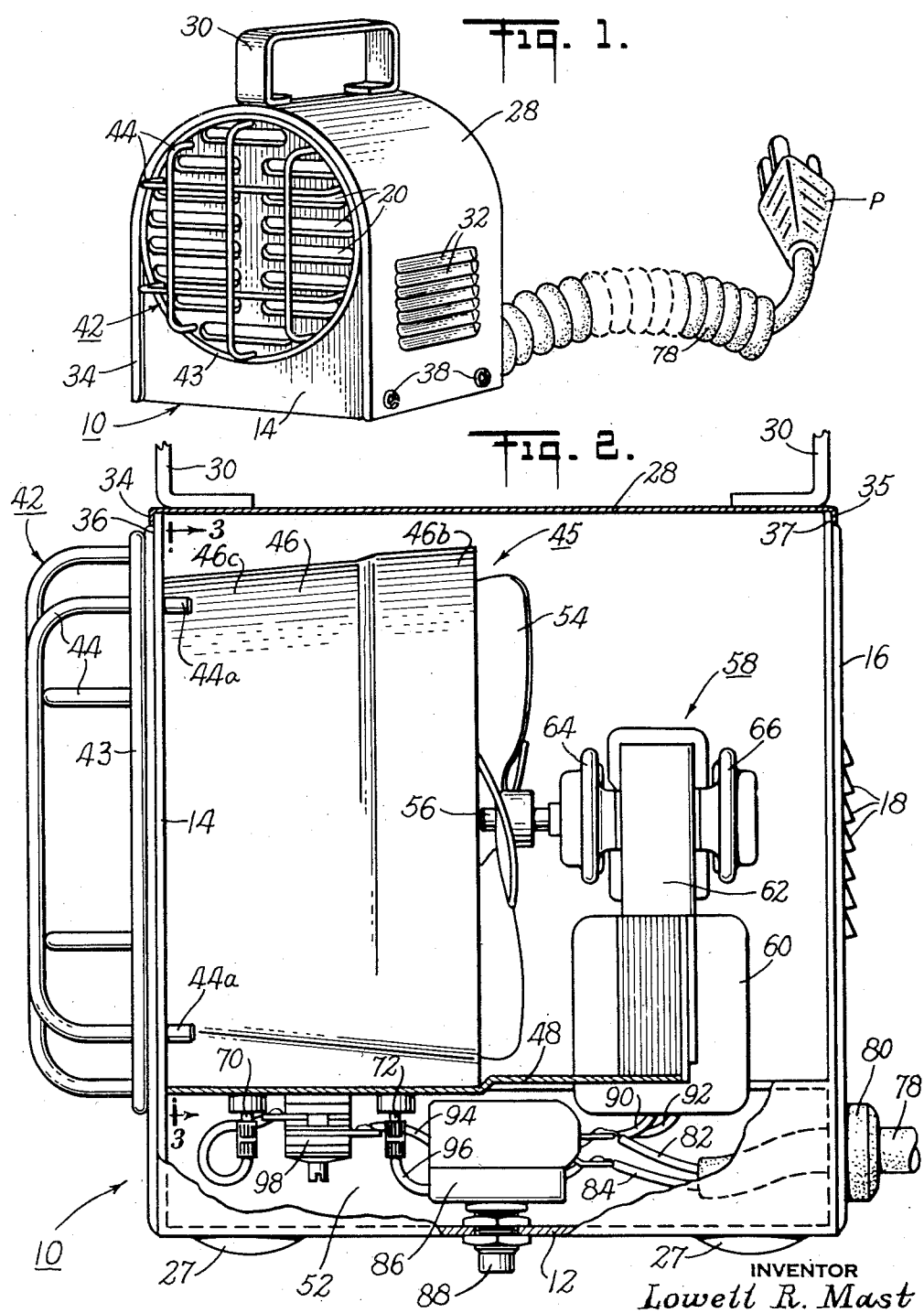

June 17, 1958 L. R. MAST 2,839,657
SPACE HEATER
Filed Nov. 1, 1956 4 Sheets-Sheet 2

INVENTOR
Lowell R. Mast
BY
Blair & Spencer
ATTORNEYS

June 17, 1958 L. R. MAST 2,839,657
SPACE HEATER

Filed Nov. 1, 1956 4 Sheets-Sheet 3

INVENTOR
Lowell R. Mast
BY
Blair + Spencer
ATTORNEYS

June 17, 1958 L. R. MAST 2,839,657
SPACE HEATER
Filed Nov. 1, 1956 4 Sheets-Sheet 4
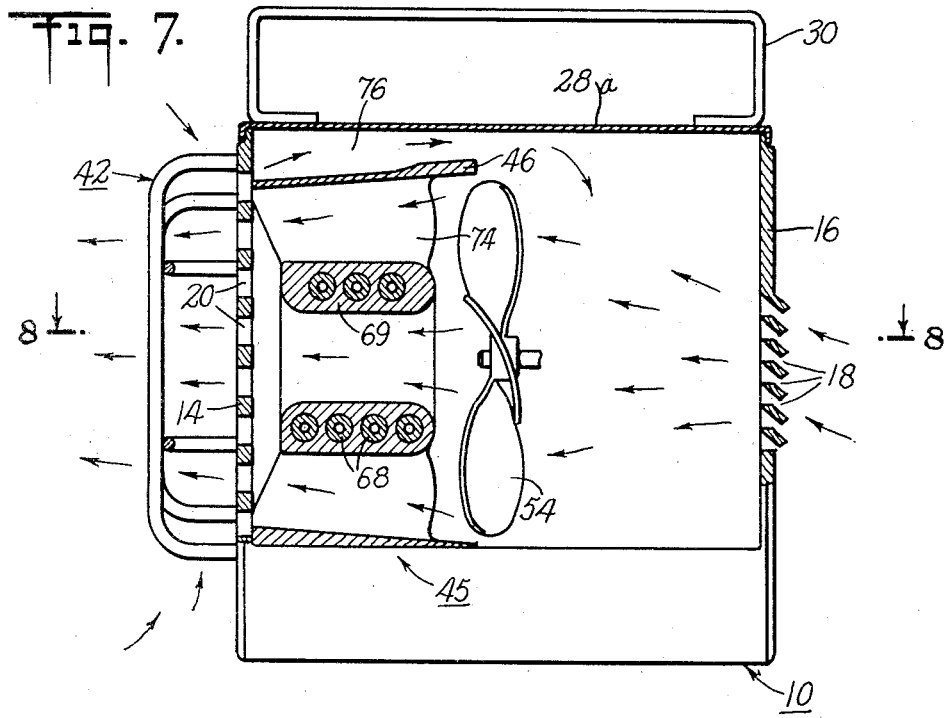
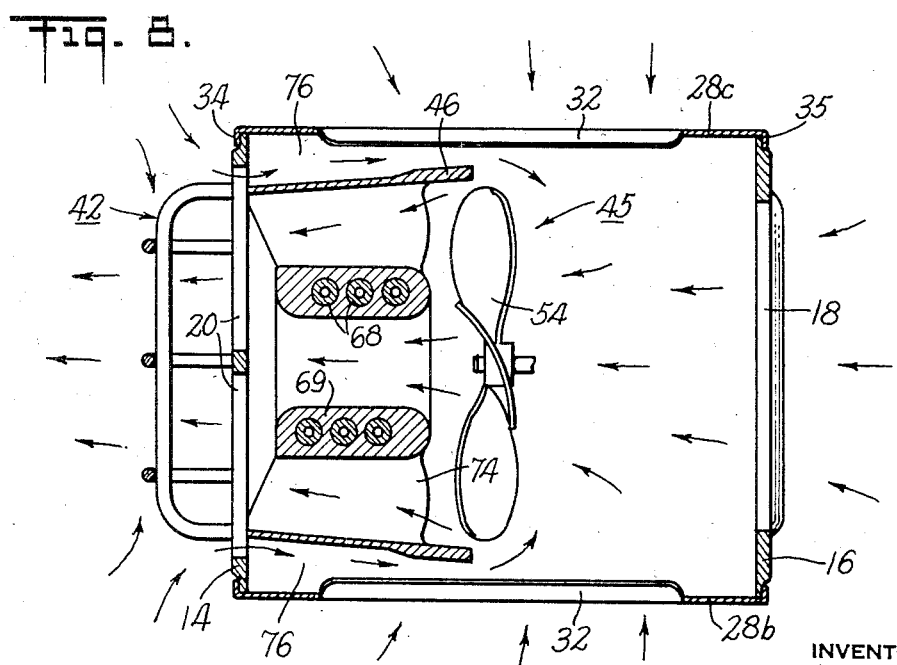
INVENTOR
Lowell R. Mast
BY
Blair T. Spencer
ATTORNEYS

United States Patent Office 2,839,657
Patented June 17, 1958

2,839,657
SPACE HEATER

Lowell R. Mast, East Rochester, N. Y., assignor to Commercial Controls Corporation, Rochester, N. Y.

Application November 1, 1956, Serial No. 619,753

14 Claims. (Cl. 219—39)

This invention relates to a portable electric space heater. More particularly, it relates to an electric heater which may be used to heat a small area or the interior of a small enclosure such as an automobile parked in a drive-in theater or the like.

The drive-in theater, in which the viewer may remain in his car while viewing a motion picture projected on a large outdoor screen, has come into increasing vogue in recent years. However, the operation of such theaters has been largely a seasonal affair, with the theaters closed down during the colder months. For various reasons conventional automobile heaters are unsuitable for use under these conditions. In the first place, to avoid discharging their batteries the automobile engines must be kept running with consequent considerable consumption of gasoline and the ever-present danger of carbon monoxide poisoning. Moreover, the din created by the operation of the automobile engines would seriously interfere with enjoyment of the motion pictures.

Accordingly, the principal object of my invention is to provide a small electric space heater suitable for heating the interior of a relatively small enclosure such as an automobile or the like and capable of being connected to a suitable exterior source of power, such as, for example, a conventional stand used to hold a loudspeaker in a drive-in theater. Another object of my invention is to provide such a heater with the special features desirable for the particular intended use, such features being lacking in presently available heaters, thus rendering them unsuitable for such use. For example, a heater intended for small enclosures should be relatively small in size while capable of delivering a sufficient quantity of warm air to rapidly bring a chilly interior up to a comfortable temperature. When intended for use in a drive-in theater, it must, of course, deliver enough heat to provide comfortable temperature for the occupants of the poorly insulated automobile, perhaps having one or more windows open to provide fresh air. Moreover, since the occupants of the automobile will in all probability be in close proximity to the heater, the blast of air from the heater should be tempered to a reasonably comfortable level within a close proximity thereto. Additionally, the electrical elements of the heater should be inaccessible from the exterior, particularly to safeguard the small fingers of curious children. It should be rugged in construction to endure the inevitable mishandling occasioned by being dropped on the ground. The exterior casing of the heater should never be more than warm to the touch to prevent burning those who may come in contact with it. The heater should be quiet in operation and should have safety features appropriate to its intended use. Finally, to be easily portable, it should be light in weight and, because of the large number required, low in unit cost. Other objects will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Figure 4:
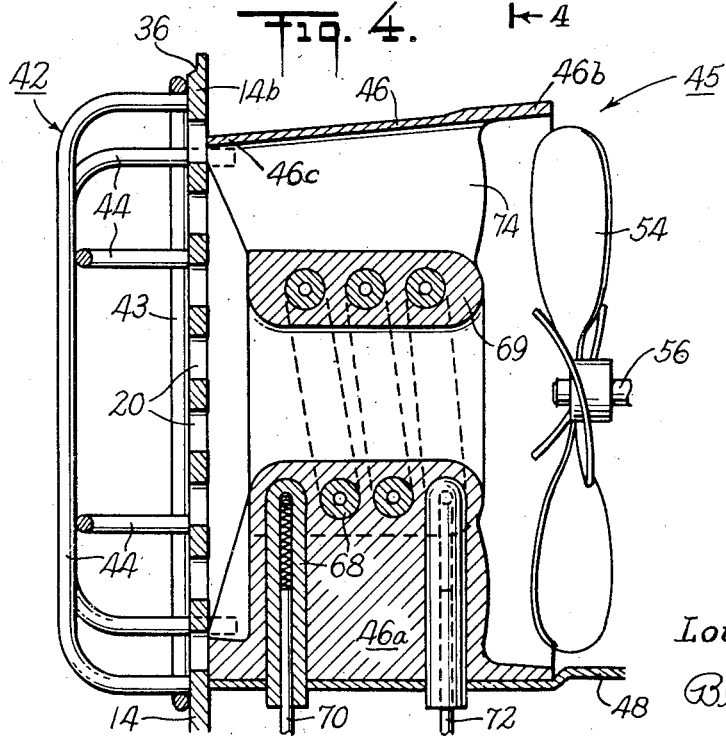
Figure 5:
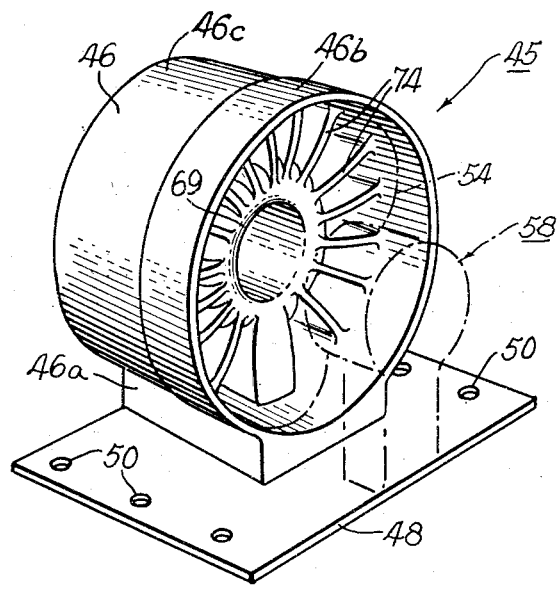
Figure 6:
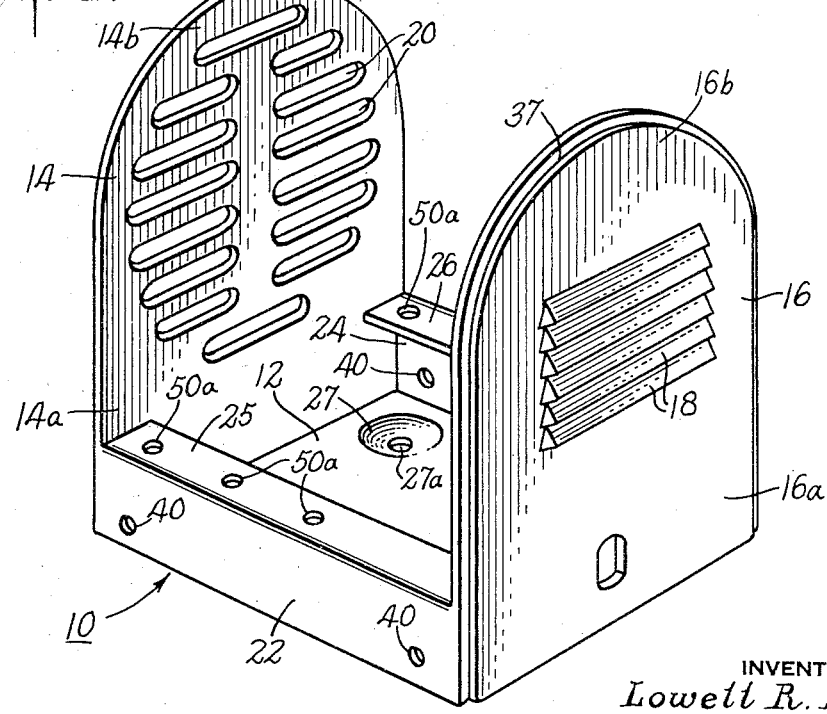

For a fuller understanding of the nature and objects of the invention, reference should be had to the following detailed description taken in connection with the accompanying drawings in which:

Figure 1 is a perspective view of my new heater,

Figure 2 is an enlarged side elevational view, certain portions being broken away and others shown partly in section, to show the disposition of certain of the elements thereof, Figure 3 is a fragmentary sectional elevation taken along line 3—3 of Figure 2, Figure 4 is a fragmentary staggered sectional elevation taken along line 4—4 of Figure 3, with the cover of the heater removed, Figure 5 is a perspective view of the heating unit and the base with the housing removed, Figure 6 is a perspective view of the end and lower sections of the heater housing, Figure 7 is a somewhat schematic side elevational view, partly in section, showing the path of air flow through the heater, and Figure 8 is a partially schematic sectional view in plan taken along line 8—8 of Figure 7 and showing path of air flow through the heater as seen from above.

In general my heater, as seen in Figure 1, comprises a compact rectangular casing having a rounded top snugly fitting about the components contained therein. Louvered openings in the side and rear of the heater casing allow passage of air therethrough but prevent access to its interior as does the double grill arrangement in the front thereof. As will be described, an electrical heating element within the casing is enclosed in a baffle between which and the casing I provide a generally U-shaped chamber which insulates the heating element from the casing. A fan forces cool air through the baffle, where it is heated by the heating element, and out through the front grill opening. By use of a novel venturi arrangement, I provide a back flow of air through the front grill opening and between the baffle and the outer casing to further insulate the casing from the baffle. The venturi effect which imparts high velocity to the air issuing from the front grill also draws a secondary flow of cool air from the vicinity of the heater inwardly toward it to mix therewith and temper it, so that within a few inches from the front heater, the high velocity relatively hot blast of air from the heating coil has been transformed into a relatively low velocity-large volume flow of air at a comfortable temperature. By such an arrangement I am able to dispose the heating coils in a very compact arrangement and pass air therethrough at high velocity, thus keeping the overall size of the heater to an absolute minimum. As will be further shown, my heater is particularly suited for outdoor storage since the components exposed to the elements are of essentially weatherproof design, while the weather sensitive components are located in a substantially weatherproof compartment.

More particularly, as seen in Figure 6 a base unit generally indicated at 10 has a bottom 12 with a front wall 14 and a back wall 16 having generally rectangular lower portions 14a and 16a extending upwardly into generally hemispheric portions 14b and 16b. Preferably the back wall 16 has a series of horizontally disposed louvers 18 for admitting cool air into the interior of the heater in a manner which will be described but so designed and arranged as to prevent ingress of rain, snow, etc. The front wall 14 has a series of horizontally disposed exit apertures 20 arranged in a generally circular pattern for discharge of the heated air. Extending between walls 14 and 16 are side plates 22 and 24 having formed thereon horizontal flanges 25 and 26 for supporting a heating unit in a manner to be described. A plurality of feet 27 (Figure 2) formed by downwardly dimpling portions of bottom 12 may be provided to space the bottom from the surface supporting the heater and to provide clearance for a cut-out switch to be described. The entire base unit 10 is preferably heavy gage steel formed to lend strength and rigidity to the unit as a whole, flanges 25 and 26 further enhancing these desirable features. The unit may be galvanized after fabrication to increase its resistance to corrosion.

Referring to Figure 1, a cover 28 conforming to the contour of walls 14 and 16 and having a top 28a and sides 28b and 28c (see also Figure 8) may be provided with a handle 30 suitably attached thereto. Inlet louvers 32, similar to louvers 18, are formed in sides 28b and 28c for a purpose to be described. More particularly, cover 28 (Fig. 8) is provided with front and rear flanges 34 and 35 which interfit respectively with recesses 36 and 37 formed along the edges of walls 14 and 16 thus to provide an efficient seal between the cover and the end walls and also to facilitate locating the cover on the base. Cover 28 may be secured to base unit 10 by screws 38 threaded through the cover and into mating holes 40 in side plates 22 and 24. The cover is desirably of relatively heavy gage material, and this, together with the curvature of the top 28a thereof, provides the desired ruggedness. Thus the entire housing is virtually immunized from the inevitable mishandling encountered in use, particularly in drive-in theaters or the like. It will be appreciated from a comparison between the heater and the electric plug P (Figure 1) that the entire unit is small in size, and, as will be seen, the shape of ends 14 and 16 and cover 28 are such as to closely fit about the components contained therein.

As best seen in Figures 1 and 2, I preferably provide an exterior grill generally indicated at 42 in front of the apertures 20 with U-shaped bars 44 welded to and supported from a ring 43 adjacent the front end 14. Certain of the bars 44 may have ends 44a projecting through wall 14 and secured thereto in any suitable manner thus to fasten the grill to the front wall.

Referring to Figures 2 and 5, a heating unit generally indicated at 45 includes a baffle 46 having a generally frusto-conical shape and containing an electrical heating element. The baffle has a lower portion 46a suitably secured to a base plate 48; which is mounted on flanges 25 and 26 (Figure 3) by screws (not shown) passing through matching holes 50 and 50a in the base plate and the flanges respectively. Thus a compartment 52 (Fig. 2) is formed between plate 48 and bottom 12 to house various electrical components to be described. As best seen in Figure 2, a fan 54 is so located as to force air into the large end 46b of baffle 46 and out through the small end 46c thereof, which abuts the front wall 14 of the base unit 10, this end 46c being aligned with the apertures 20 (see Figs. 7 and 8). It will be noted from Figures 4, 7 and 8 that the diameter of the small end 46c of the frustro-conical baffle is smaller than that of the circle defined by apertures 20, thereby providing a chamber 76 for an additional path for air flow inwardly through the apertures and adjacent the exterior surface of the baffle and the interior surface of the cover for purposes to be described.

Fan 54 (Fig. 2) is keyed to the shaft 56 of an electric motor generally indicated at 58 suitably secured to base plate 48. Motor 58 is preferably a hysteresis synchronous motor of the type often used in electric clocks, having an encased field winding indicated at 60 with pole pieces 62 extending upwardly therefrom and having no armature winding, brushes, etc. Sealed bearings 64 and 66 are also provided, thus rendering the motor essentially weatherproof. Thus, upon operation of motor 58 fan 54 draws air in through louvers 18 and 32 and forces it through baffle 46 where it is heated by the heating element contained therein and thence discharges through apertures 20.

Referring now to Figures 3 and 4, a coiled heating element 68 is preferably completely encased in a casting 69 disposed generally centrally of baffle 46 with lead wires 70 and 72 extending downwardly therefrom through portion 46a and base plate 48 into compartment 52 (Fig. 2). Preferably a set of heat conducting fins 74 disposed radially about coil 69 are cast integrally with casting 69 and with baffle 46 so that upon energization of element 68 the surfaces of casting 69, fins 74, and baffle 46 all become heated to a high temperature, thereby to efficiently heat the air forced therethrough by fan 54.

It will be noted that fan 54, like all propeller type fans, produces an air stream having a substantially annular cross section, this being due to the higher velocity and larger size of the end portions of the blades. Thus heating elements disposed in front of such fans were formed in circles to intercept and heat the air flowing thereby and the central space remained substantially unused. My frustro-conical baffle 46, however, forces some of the peripherally disposed air to flow inwardly, thus to form an air stream of substantially even cross-section. Thus the heating element 68 and associated parts may be formed in a small, compact area with considerable saving of space.

It will be seen that by packaging a considerable length of heating element 68 in such a small space and by providing such efficient means for conducting heat therefrom, the air passing through baffle 46 will be heated to a relatively high temperature, and since fan 54 and motor 58 are designed to force air through the baffle at high velocity, a narrow high-temperature main stream of air, converged by the conical shape of baffle 46, is projected a considerable distance through apertures 20 into the enclosure to be heated. Thus while the desirable size of the heater is attained, the heater without the structural features I have provided would be unsuitable for use in small enclosures, particularly automobiles, where the occupants are normally positioned in close proximity to the discharge of hot air.

It will now appear with reference to Figures 7 and 8, that fan 54 draws in cool air through rear louvers 18 and side louvers 32 and forces it through the conical baffle 46 which, as described above, converges the air stream flowing therethrough and thus forms in effect a venturi with a lowered air pressure adjacent the air stream exiting therefrom and particularly in the areas of apertures 20 outside the small end 46c thereof. Thus this venturi effect, aided by the impeding effect of louvers 18 and 32 on inflowing air, creates a back flow of air inwardly through the outer portions of apertures 20, into chamber 76 between baffle 46 and cover 28 and then to fan 54 to be forced through the baffle. This back flow forms an insulating layer of cool air in chamber 76 to prevent substantial transmission of heat from baffle 46 to cover 28, thus enhancing the effect of spacing the baffle from the cover to prevent the cover from reaching unsuitably high temperature. Additionally the venturi effect causes a secondary unheated air stream externally of the heater to flow inwardly toward the main air stream and thus mix with it, so that within a short distance from the front of the heater the air issuing therefrom is tempered to a warm and comfortable temperature. In this manner a small volume of hot air is transformed into a large volume of comfortably warm air. Since the baffle 46 may have a non-circular lateral cross section, or a non-linear longitudinal cross section and yet provide the above described venturi effect, it is intended that the term "frustro-conical," as used herein and in the claims be construed to include any baffle shape which will provide such effect.

Referring once again to Figure 2, power may be brought into the heater by a suitable line cord 78 entering compartment 52 through a tight-fitting grommet 80 in wall 16 and having wires 82 and 84 connected to the line side of a normally open plunger type switch 86 mounted with its plunger 88 extending through the bottom 12. Cord 78 is preferably of an extensible type being stretchable to reach the interior of an automobile, for example, from a conventional loudspeaker standard in a drive-in theater. Switch 86 is adapted to be actuated whenever the heater is placed upright on a suitable surface such as a car floor or the like to force plunger 88 upwardly to close electrical contacts contained therein. Thus, when the heater is removed from the automobile and hung on a loudspeaker standard, etc., by handle 30, or is laid on its side, the switch automatically opens to cut off electrical power and prevent waste thereof. Should the heater be thrown from an automobile window, it will in all likelihood come to rest on a side thereof, again disconnecting power thereto.

A pair of wires 90 and 92 run from the load terminals of switch 86 to motor 58 for operation of fan 54 and a similar pair of wires 94 and 96 convey power to heating element 68 through lead wires 70 and 72, with a suitable thermostatic high temperature cutout 98 interposed between wire 94 and terminal 70 to interrupt operation of the coil when the temperature of the heater rises to a predetermined point, thereby preventing overheating of the unit. It will be noted that the weatherproof elements such as motor 58 and encased heating element 68 are located in the exposed space above base plate 48, while the exposed elements such as switch 86, cutout 98 and the various electrical connections are disposed in the protected compartment 52 therebeneath, thus making the entire heater impervious to weather effects and suitable for outdoor storage. As an added safeguard weep holes 27a (Figure 6) may be provided to prevent accumulation of moisture which may leak into or condense in the compartment.

In recapitulation, power conveyed to heating element 68 by way of switch 86 and cutout 98 heats the element and associated components in baffle 46 to a high temperature so that air forced therethrough by fan 54 comes into contact with these components to be heated to relatively high temperatures and yet in a small space. As best seen in Figures 7 and 8, fan 54 draws air in through rear louvers 18 and side louvers 32 before forcing it through baffle 46 and outwardly through the central portions of apertures 20 in the front of the heater. The frustro-conical shape of baffle 46 creates a venturi effect encouraging a back flow of cooling air inwardly through the outer portions of apertures 20 and through chamber 76, thereby preventing any considerable transfer of heat from baffle 46 to cover 28 and maintaining the cover at a comfortable temperature. As seen in Figure 2, fan 54 is disposed partly within end 46b of the baffle, and thus substantially all of the air impelled by it is directed through the baffle thereby avoiding impedance of the back flow through chamber 76.

The high velocity hot main stream issuing from baffle 46 (see Figs. 7 and 8) draws a secondary flow of cool air inwardly which tempers it to a comfortable temperature close to the front of the heater. Thus the heater may be placed in a small enclosure such as an automobile in close proximity to the occupants thereof and provide sufficient heat to maintain a comfortable temperature. The main stream issuing from the heater should preferably be at high velocity to insure proper mixture with cooler air in the vicinity. Thus, frustro-conical baffle 46 provides a venturi effect to increase the velocity of air passing through it; accordingly a larger fan 54 may be used at slower speed, assuring quiet operation. The higher velocity thus obtained also projects the main stream a greater distance and lends directivity to it, so that warm air may be directed to an object a considerable distance from the heater. The directivity is also enhanced by the solid cross section of the main stream described above.

Thus by the particular arrangement of elements described above, I have provided an efficient heater having small physical dimensions and being light in weight so as to be readily portable and useable within the smallest of enclosures. The heater is essentially weatherproof and thus may be hung on a conventional loudspeaker stand in a drive-in theater to be adapted for heating the interior of automobiles parked therein. By virtue of the inaccessability of the hot heating coil 68 and the exposed electrical elements in compartment 52, the desired safety features are effectively attained. Power economy is assured by the novel arrangement of switch 86 requiring that the heater, to be operative, be positioned with its bottom in contact with a fairly smooth surface such as an automobile floor. Furthermore the heater is extremely rugged in construction and thus easily withstands such abuse as being thrown from automobile windows, kicked, dropped, etc. Additionally, the heater is quiet in operation and therefore does not interfere with the enjoyment of the moving picture being viewed from the automobile.

It will be apparent from the above description that efficient use of the heater is not limited to small enclosures although it has particular utility in such application; it may also be used to advantage in heating small areas of larger enclosures. Moreover, it is evident that larger versions may be used to heat larger areas where desirable.

It will thus be seen that the several objects set forth above, are efficiently attained.

Since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. In an electric space heater the combination of a generally frustro-conical baffle, a heating element disposed within said baffle, a plurality of high heat conducting fins in close thermal conducting relationship with said element and substantially parallel to the longitudinal axis of said baffle, a fan adapted to force a main stream of air into the larger end of said baffle whereby said air may contact said element and said fins to become heated thereby and thence issue from the smaller end of said baffle, said fan being disposed substantially upstream of said smaller end, whereby said baffle converges said main stream and creates a venturi effect in the neighborhood of said smaller end to draw a cooler secondary flow of air inwardly toward the hot main stream issuing therefrom to heat said secondary air flow and to reduce the temperature of said main stream to a comfortable level.

2. The combination defined in claim 1 in which said fins extend radially outwardly from said heating element to be in close thermal conducting relationship with the surface of said baffle.

3. In an electric space heater the combination of a housing, a generally frustro-conical baffle disposed within said housing, the surface of said baffle being substantially air impervious and spaced from the walls of said housing, the smaller end of said baffle being disposed substantially adjacent an end wall of said housing, means forming apertures in said end wall of said housing interiorly of the diameter of said smaller end, a heating element disposed within said baffle, a fan mounted in said housing to force a main stream of air into the larger end of said baffle whereby said air is heated by said element and thence issues from said housing through said smaller end of said baffle and said apertures in said end wall, said fan being disposed upstream of said heating element and substantially upstream of said smaller end of said baffle, whereby the flow of air issuing from said baffle is converged thereby and creates a venturi effect in the neighborhood of the smaller end thereof to draw a secondary supply of air toward said main stream, thereby to heat said secondary supply and reduce the temperature of said main stream to a comfortable level.

4. In an electric space heater the combination of a housing having a closed bottom, a base plate extending substantially laterally across the housing above said bottom and dividing the interior of said housing into an upper compartment and a lower compartment, means forming exit apertures in one wall of said housing, a frustro-conical baffle disposed in said upper compartment with its smaller end adjacent said exit apertures, an encased heating element disposed within said baffle, a fan adapted to force a main stream of air into the larger end of said baffle to be heated by said element and thence to discharge from said heater through said exit apertures, said fan being disposed adjacent said larger end the surface of said baffle being spaced from the top and side walls of said housing to minimize the transmission of heat thereto, the flow of said main stream of air through said baffle converging and creating a venturi effect in the neighborhood of the smaller end thereof whereby a secondary supply of air is drawn inwardly toward said heated main stream to heat said secondary supply and to reduce the temperature of said main stream to a comfortable level, a normally open electrical switch located in said lower compartment and having its actuating element extending through the bottom of said housing, said switch being connected in series with the electrical power to said heating element and said fan, said switch being adapted to close in response to inward force on said actuating element, whereby said switch will be closed to connect power to said heating element and said fan only when said heater rests in a substantially upright position on its bottom surface.

5. The combination defined in claim 4 including a high temperature thermostatic cutout element in series with the power to said heating element.

6. In an electric space heater the combination of a housing having side walls, a front wall and a back wall, a generally frustro-conical baffle having a substantially air impervious surface disposed within said housing and generally parallel to and closely spaced from said side walls to form a chamber between said surface of said baffle and said side walls, the smaller end of said baffle lying substantially adjacent said front wall, means forming an aperture in said front wall interiorly of the diameter of said smaller end, means forming an aperture in said front wall exteriorly of said diameter, means forming an aperture in another of said walls, a heating element disposed within said baffle, a fan mounted in said housing to force a main stream of air into the larger end of said baffle, whereby said air is heated by said heating element and thence issues from said housing through said smaller end and said interior aperture, said fan being disposed upstream of said heating element in such location that substantially its entire output passes directly through said baffle, whereby the flow of said main stream issuing from said baffle is converged to create a venturi effect in the neighborhood of said smaller end, whereby a back flow of unheated air is drawn through said exterior aperture and said chamber to maintain said side walls of said housing at a comfortable temperature and a secondary supply of air is drawn inwardly toward the hot main stream to mix therewith to become heated and to reduce its temperature to a comfortable level.

7. In a space heater the combination of a frustro-conical baffle, a heating element arranged substantially throughout the entire cross-section of said baffle, and a fan adjacent the larger end of said baffle to direct an air stream therethrough, whereby the passage of air through said baffle is impeded to provide a flow of air substantially throughout its entire cross-section as it exits from said baffle and whereby the entire heating surface of said element is efficiently used to heat said air stream passing through said baffle.

8. In an electric space heater the combination of a generally tubular baffle having a substantially air impervious surface, one end of said baffle having a greater diameter than the other end, a heating element disposed in said baffle, means adapted to impel a main stream of air through said baffle from the larger end thereof, whereby said air is heated by said heating element and issues from the smaller end of said baffle, said air impelling means being disposed upstream of said heating element, whereby the pressure upstream of said heating element is greater than the pressure downstream thereof and the stream of air passing through said heating element has a substantially uniform flow rate across the entire cross section of said baffle, and whereby the flow of said main stream creates a venturi effect in the neighborhood of the smaller end of said baffle to draw a secondary flow of air inwardly toward said main stream to lower the temperature thereof and heat said secondary air.

9. The combination defined in claim 8 in which said baffle is substantially frustro-conical in shape.

10. In an electric space heater the combination of a housing having side walls, a front wall and a back wall, a generally frustro-conical baffle having a substantially air impervious surface disposed within said housing and generally parallel to and closely spaced from said side walls to form a chamber between said side walls and said surface, the smaller end of said baffle lying substantially adjacent said front wall, means forming an aperture in said front wall interiorly of the diameter of said smaller end, means forming an aperture in said front wall exteriorly of said diameter, means forming an inlet aperture in another of said walls, a heating element disposed within said baffle, said heating element comprising a multi-turn helically-formed heating coil disposed substantially coaxially with said baffle and a plurality of radially extending fins thermally connecting said heating coil with the surface of said baffle, said fins being substantially coextensive with said coil and substantially parallel to the axis of said baffle, said coil and fins being so proportioned and arranged that the heating surfaces presented thereby are substantially uniformly disposed throughout the cross section of said baffle, a fan mounted in said housing upstream of said heating element and adapted to force a main stream of air into the larger end of said baffle, whereby said air is heated by said heating element and then issues from said housing through said smaller end and said interior aperture, whereby the pressure built up between said fan and said heating element by the restriction in cross-sectional area downstream of said fan causes the air passing through said heating element to have a substantially uniform flow rate over the entire cross-section of said baffle and whereby the flow of said main stream issuing from said baffle is converged thereby and creates a venturi effect in the neighborhood of said smaller end, whereby a back flow of air is drawn through said exterior aperture and said chamber to maintain said side walls of said housing at a comfortable temperature and a secondary supply of air is drawn inwardly toward the hot main stream to mix therewith to become heated and to reduce its temperature to a comfortable level.

11. In an electric space heater the combination of a housing, a tubular baffle disposed within said housing and having a large end and a small end, said small end being disposed adjacent an end wall of said housing, means forming an aperture in said end wall interiorly of the diameter of said small end, a heating element in said housing, said heating element comprising an electrical heating coil and radially extending fins thermally connecting said coil with the surface of said baffle, said fins being substantially parallel to the axis of said baffle, whereby said coil, said fins and said baffle have heat-emitting surfaces for heating air passing thereby, said coil and fins being so arranged that said heat-emitting surfaces are disposed substantially uniformly over the cross section of said baffle, a fan disposed adjacent the larger end of said baffle and adapted to force a stream of air through said baffle whereby said air is heated therein and thence issues from said housing through said aperture, the constriction in said baffle due to the difference in size of said ends building up the pressure between said fan and said heating element and causing the air stream through said heating element to have a substantially uniform flow rate over the cross section of said baffle, thereby to utilize efficiently all of said heat-emitting surfaces, the outer surface of said baffle being spaced apart from the side walls and the top and bottom of said housing to form a chamber therebetween, whereby air in said chamber insulates the exterior of said housing from said baffle.

12. The combination defined in claim 11 in which said baffle is substantially frustro-conical in shape.

13. The combination defined in claim 12 including a second aperture in said end wall exteriorly of the diameter of said small end, whereby a stream of air is drawn inwardly through said second aperture and the space between said baffle and said housing, thereby to insulate and cool said housing.

14. In an electric space heater, the combination of a base, a front wall and a back wall, a pair of opposing side plates extending between said front and back walls, a cover member U-shaped in cross-section and adapted to rest on said front and back walls and side plates, a base plate secured to said side plates and extending across said heater to divide it into upper and lower compartments, a tubular baffle in said upper compartment, an encased heating element in said baffle, a fan adapted to pass air over said element to be heated thereby, means forming apertures in one of said end walls in said upper compartment for egress of heated air, means forming a louvered aperture in another wall of said upper compartment for ingress of unheated air, said baffle being spaced from said side walls to form an insulating chamber between the surface of said baffle and said side walls, the terminals of said heating coil being disposed in said lower compartment, all water susceptible electrical parts in said lower compartment being spaced from said base and said side plates and walls, said base being substantially weather impervious but having an aperture for moisture drainage, whereby moisture may drain from said lower compartment before rising to the level of said water susceptible parts.

References Cited in the file of this patent

UNITED STATES PATENTS

| | | |
|---|---|---|
| 1,531,520 | Simmons | Mar. 31, 1925 |
| 1,967,757 | Losee | July 24, 1934 |
| 1,998,670 | Goshorn et al. | Apr. 23, 1935 |
| 2,120,795 | Boothby | June 14, 1938 |
| 2,415,621 | Arnhym | Feb. 11, 1947 |
| 2,590,600 | Farr et al. | Mar. 25, 1952 |